2 Sheets--Sheet 1.
C. HOLZNER & S. LAUER.
Chemical Fire-Extinguihers.
No. 157,177. Patented Nov. 24, 1874.
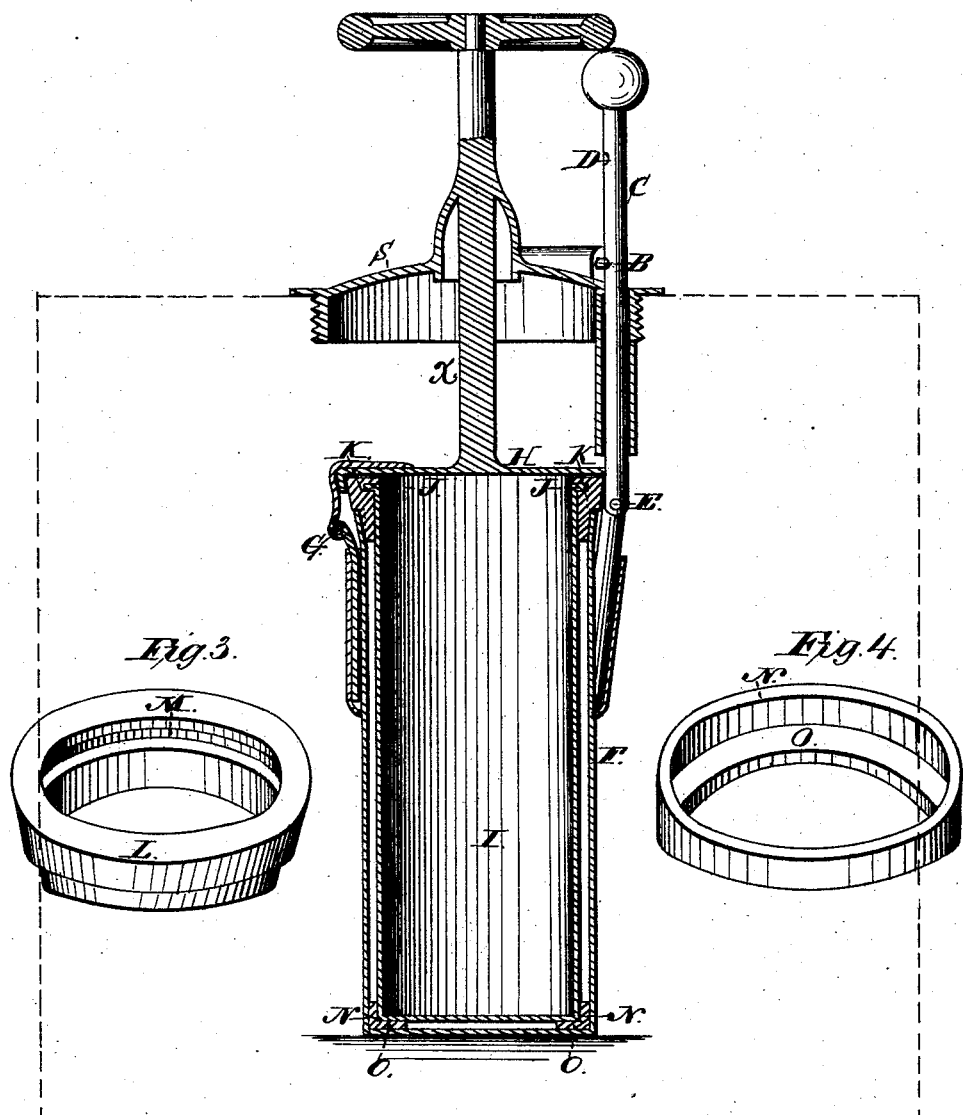
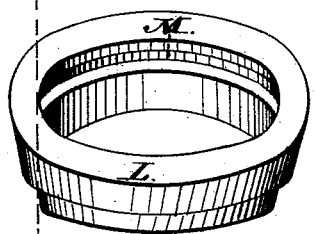
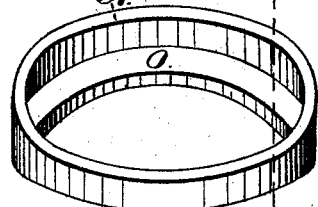

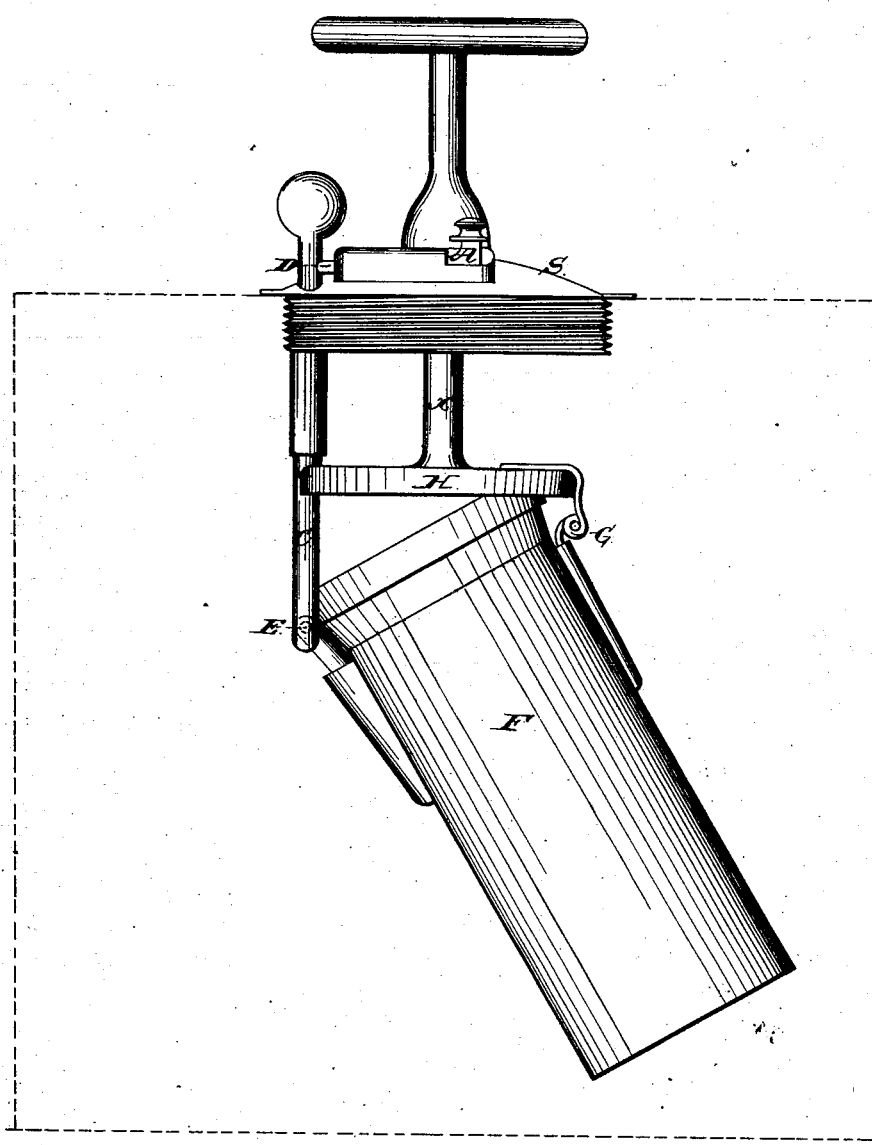

UNITED STATES PATENT OFFICE.

CHARLES HOLZNER AND STEPHEN LAUER, OF LOUISVILLE, KENTUCKY.

IMPROVEMENT IN CHEMICAL FIRE-EXTINGUISHERS.

Specification forming part of Letters Patent No. 157,177, dated November 24, 1874; application filed July 9, 1874.

*To whom all it may concern:*

Be it known that we, CHARLES HOLZNER and STEPHEN LAUER, of Louisville, in the county of Jefferson and State of Kentucky, have invented a new and Improved Chemical Fire-Extinguisher; and we do hereby declare that the following is a full, clear, and exact description of the same, reference being had to the accompanying drawings, forming a part of this specification.

Our invention belongs to the class of fire-extinguishers in which acid and alkaline elements are employed to form carbonic-acid gas, the same being contained in separate vessels, and caused to intermingle when required. The invention consists in the mode or means of connecting the inner smaller acid-containing vessel to the cover of the larger outer or alkaline-containing vessel, so that the former can be tilted; also, to the application of rubber gaskets between, and in combination with, the two parts or shells of which the inner vessel is composed, as hereinafter described.

In the drawing, Figure 1 represents a side elevation of our improved fire-extinguisher, minus the outer tank or vessel, and the cover of the inner vessel being closed. Fig. 2 is a side elevation of the same, the cover of the inner vessel being open. Figs. 3 and 4 are perspective views of the gaskets.

The outer tank or vessel is shown in the drawings, Fig. 2, in dotted lines only. It is required to be of such size and form as to permit the inner vessel to be tilted within it, as shown, Fig. 2, and thus allow the contents of the two vessels to intermingle when the outer one is inverted. The covers of the inner and outer vessels are connected to the same vertical rod or stem X, and preferably cast solid therewith. This stem is an extension of the handle of the upper cover S. The latter is provided with a screw-threaded circular flange, to adapt it for attachment to and detachment from the outer vessel in the usual manner. The lower cover H is attached to the side of the vessel F by means of a strap-hinge, G, as shown. The means for locking the cover consist of a spring-slide, A, and a rod or bar, C, which is jointed at E, (just below the top of vessel I,) and passes through the cover S at a point inside the screw-flange thereof. A tube extends down from the cover to form an elongated socket for the rod C; but this may be dispensed with. The lower end of the rod C is attached to the side of the vessel F by any suitable means. Two or more notches, D, are formed in the upper end of the rod C, to receive the end of the slide-bar A. The latter is inclosed, with its spring, in a case or socket formed on the cover S.

When the extinguisher is required for use the spring-slide A is drawn back from notch B, and the vessel F swung or tilted on the hinge G by pushing down the rod C till said parts assume the position shown in Fig. 2, in which they are held by means of the slide A entering the upper notch D in said rod. The tank or outer vessel may now be inclined or inverted to cause its contents to thoroughly intermingle with those of vessel I, and produce the desired rapid evolution of a great volume of gas. The vessel F is thus neither broken nor injured, and both vessels may be recharged without difficulty or delay by removing from the outer vessel the cover S and its attached parts. The extinguisher, as a whole, may be made portable, in any desired or approved manner.

The vessel F is made in two parts or shells, of corresponding shape, except that the inner one has an exterior rib or flange, K, formed wholly or partly around its top portion. Gaskets L N, of india-rubber, are fitted between the shells at top and bottom respectively, to insure a tight joint beneath the cover H. The gasket L has a circumferential inner groove, M, to receive the rib K of vessel F, and its lower edge is beveled to adapt it to enter and be tightly wedged between the shells I and F at the top. The gasket N has a rabbet, O, to adapt it to fit the bottom edge of the inner shell I. The latter will be made of material suited to resist the chemical action of the ingredients of both the inner and outer vessels.

What we claim is—

1. In a chemical fire-extinguisher, the combination of covers S and H, the inner vessel hinged as shown, the stem X, and a jointed push-rod, C, for tilting said vessel, as shown and described.

2. The combination of the spring locking-slide A, attached to the cover S, with the rod E, having notches B D, and the vessel I F and hinged cover H, as shown and described.

3. The gaskets L N, in combination with the two parts of the inner vessel, and the cover H secured or clamped in position, as and for the purpose specified.

July 2, 1874.

CHARLES HOLZNER.
STEPHEN LAUER.

Attest:
FRANK FLASHPHELER,
STEPHEN I. BRODBECK.